United States Patent
Bargeron

(10) Patent No.: US 7,526,129 B2
(45) Date of Patent: Apr. 28, 2009

(54) LIFTING INK ANNOTATIONS FROM PAPER

(75) Inventor: David M. Bargeron, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 591 days.

(21) Appl. No.: 11/165,070

(22) Filed: Jun. 23, 2005

(65) Prior Publication Data

US 2006/0291727 A1 Dec. 28, 2006

(51) Int. Cl.
G06K 9/34 (2006.01)
G06K 9/00 (2006.01)
G06K 9/18 (2006.01)
G06F 17/00 (2006.01)

(52) U.S. Cl. .............. 382/179; 382/101; 382/119; 382/137; 382/186; 715/230

(58) Field of Classification Search ......... 382/101–102, 382/119, 137–140, 179, 186–189, 257, 294–296, 382/116; 715/230–233
See application file for complete search history.

(56) References Cited

U.S. PATENT DOCUMENTS

| | | | |
|---|---|---|---|
| 3,701,095 A | 10/1972 | Yamaguchi et al. | |
| 4,955,066 A | 9/1990 | Notenboom | |
| 5,109,433 A | 4/1992 | Notenboom | |
| 5,181,255 A | 1/1993 | Bloomberg | |
| 5,237,628 A * | 8/1993 | Levitan | 382/175 |
| 5,297,216 A | 3/1994 | Sklarew | |
| 5,465,353 A | 11/1995 | Hull et al. | |
| 5,499,294 A | 3/1996 | Friedman | |
| 5,526,444 A | 6/1996 | Kopec et al. | |
| 5,542,006 A | 7/1996 | Shustorovich et al. | |
| 5,594,809 A | 1/1997 | Kopec et al. | |
| 5,699,244 A | 12/1997 | Clark et al. | |
| 5,812,698 A | 9/1998 | Platt et al. | |
| 5,832,474 A | 11/1998 | Lopresti et al. | |
| 5,867,597 A | 2/1999 | Peairs et al. | |
| 5,999,653 A * | 12/1999 | Rucklidge et al. | 382/227 |
| 6,137,908 A | 10/2000 | Rhee | |
| 6,279,014 B1 | 8/2001 | Schilit et al. | |
| 6,356,922 B1 | 3/2002 | Schilit et al. | |
| 6,397,212 B1 | 5/2002 | Biffar | |
| 6,470,094 B1 | 10/2002 | Lienhart et al. | |
| 6,487,301 B1 | 11/2002 | Zhao | |
| 6,523,134 B2 | 2/2003 | Korenshtein | |

(Continued)

OTHER PUBLICATIONS

Ming Ye, Marshall Bern and David Goldberg, "Document Image Matching and Annotation Lifting", 2001, IEEE ICDAR.*

(Continued)

*Primary Examiner*—Matthew C Bella
*Assistant Examiner*—Manav Seth
(74) *Attorney, Agent, or Firm*—Amin, Turocy & Calvin, LLP

(57) ABSTRACT

A computer-implemented system for obtaining ink annotations from paper comprises a comparator that compares an initial electronic version of a document with an electronic image of an annotated version of the document to identify a handwritten annotation. The system also includes an annotation lifter that extracts the handwritten annotation from the electronic image and converts the handwritten annotation into a computer-usable form. Methods for using the system are also provided.

8 Claims, 12 Drawing Sheets

U.S. PATENT DOCUMENTS

| | | | |
|---|---|---|---|
| 6,546,385 | B1 | 4/2003 | Mao et al. |
| 6,580,806 | B1 | 6/2003 | Sato |
| 6,587,217 | B1 | 7/2003 | Lahey et al. |
| 6,594,393 | B1 | 7/2003 | Minka et al. |
| 6,658,623 | B1 | 12/2003 | Schilit et al. |
| 6,687,876 | B1 | 2/2004 | Schilit et al. |
| 6,869,023 | B2 | 3/2005 | Hawes |
| 6,928,548 | B1 | 8/2005 | Hale et al. |
| 6,938,203 | B1 * | 8/2005 | Dimarco et al. ............ 715/209 |
| 7,024,054 | B2 * | 4/2006 | Cahill et al. ................ 382/294 |
| 7,062,497 | B2 | 6/2006 | Hamburg et al. |
| 7,111,230 | B2 | 9/2006 | Euchner et al. |
| 7,120,299 | B2 | 10/2006 | Keskar et al. |
| 7,327,883 | B2 | 2/2008 | Polonowski |
| 7,373,291 | B2 | 5/2008 | Garst |
| 2002/0032698 | A1 | 3/2002 | Cox |
| 2002/0116379 | A1 | 8/2002 | Dar-Shyang et al. |
| 2003/0076537 | A1 | 4/2003 | Brown |
| 2003/0123733 | A1 | 7/2003 | Keskar et al. |
| 2003/0152293 | A1 | 8/2003 | Bresler et al. |
| 2004/0003261 | A1 | 1/2004 | Hayashi |
| 2004/0015697 | A1 | 1/2004 | de Queiroz |
| 2004/0078757 | A1 | 4/2004 | Golovchinsky et al. |
| 2004/0090439 | A1 | 5/2004 | Dillner |
| 2004/0107348 | A1 | 6/2004 | Iwamura |
| 2004/0189667 | A1 | 9/2004 | Beda et al. |
| 2004/0205542 | A1 | 10/2004 | Bargeron et al. |
| 2004/0205545 | A1 | 10/2004 | Bargeron et al. |
| 2004/0252888 | A1 | 12/2004 | Bargeron et al. |
| 2005/0138541 | A1 | 6/2005 | Euchner et al. |
| 2005/0165747 | A1 | 7/2005 | Bargeron et al. |
| 2006/0045337 | A1 | 3/2006 | Shilman et al. |
| 2006/0050969 | A1 | 3/2006 | Shilman et al. |

OTHER PUBLICATIONS

Gene Golovchinsky and Laurent Denoue, "Moving Markup: Repositioning Freeform Annotations", 2002, ACM, vol. 4, Issue 2, pp. 21-29.*

S. Marinai, et al., "Recognizing Freeform Digital Ink Annotations" Proceedings of the 6th International Workshop on Document Analysis Systems, 2004, vol. 2163, pp. 322-331.

G. Golovchinsky, et al., "Moving Markup: Repositioning Freeform Annotation" UIST 02. Proceedings of the 15th Annual ACM Symposium on user Interface Software and Technology, 2002, vol. conf. 15, pp. 21-29.

European Search Report dated Dec. 29, 2006, mailed for European Patent Application Serial No. 05 108 068.7, 2 Pages.

U.S. Appl. No. 11/095,393, Bargeron et al.

U.S. Appl. No. 11/171,064, David Bargeron.

Vinajak R. Borkar, et al., Automatically extracting structure from free text addresses, 2000, 6 pages, In Bulletin of the IEEE Computer Society Technical committee on Data Engineering. IEEE.

Remco Bouckaert, Low level information extraction: A bayesian network based approach, 2002, 9 pages, In Proceedings of TextML 2002, Sydney, Australia.

Claire Cardie, et al., Proposal for an interactive environment for information extraction, 1998, 12 pages, Technical Report TR98-1702, 2.

Rich Caruana, et al., High precision information extraction, Aug. 2000, 7 pages, In KDD-2000 Workshop on Text Mining.

M. Collins, Discriminative training methods for hidden markov models : Theory and experiments with perception algorithms, Jul. 2002, pp. 1-8, In Proceedings of Empirical Methods in Natural Language Processing (EMNLP02).

Corinna Cortes, et al., Support-vector networks. Machine Learning, 1995, 20(3): 273-297.

Y. Freund, et al., Large margin classification using the perceptron algorithm, Machine earning, 37(3):277-296.

Y. Freund, et al., Experiments with a new boosting algorithm, 1996, In International Conference on Machine Learning, pp. 148-156.

T. Kristjansson, et al., Interactive information extraction with constrained conditional random fields, 2004, In Proceedings of the 19th international conference on artificial intelligence, AAAI. pp. 412-418.

John Lafferty, et al., Conditional random fields: Probabilistic models for segmenting and labeling sequence data, 2001, In Proc. 18th International Conf. on Machine Learning, pp. 282-289. Morgan kaufmann, San Francisco, CA.

M. Marcus, et al., The penn treebank: Annotating predicate argument structure, 1994, pp. 114-119.

Andrew McCallum, Efficiently inducing features of conditional random fields, 2003, 8 pages, In Nineteenth Conference on Uncertainty in Artificial Intelligence (UAI03).

Andrew McCallum, et al., Early results for named entity recognition with conditional random fields, feature induction and web-enhanced lexicons, 2003, 4 pages, In Hearst/Ostendorf, Eds, HLT-NAACL, Ass'n for Computational Linguistics, Edmonton, Alberta, Canada.

Kamal Nigam, et al., Using maximum entropy for text classification, 1999, 7 pages, In Proceedings of the IJCAI'99 Workshop on Information Filtering.

David Pinto, et al., Table extraction using conditional random fields, 2003, 8 pages, In Proceedings of the ACM SIGIR'03, Jul. 28-Aug. 1, 2003, Toronto, Canada.

L.R. Rabiner, A tutorial on hidden markov models and selected applications in speech recognition, 1989, In Proceedings of the IEEE, vol. 77, pp. 257-286.

Fei Sha, et al., Shallow parsing with conditional random fields. In Hearst/Ostendorf, Eds, 2003, HLT-NAACL: Main Proceedings, pp. 213-220, Ass'n for Computational Linguistics, Edmonton, Alberta, Canada.

J. Stylos, et al., Citrine:providing intelligent copy-and-paste, 2005, In Proceedings of ACM Symposium on User Interface Software and Technology (UIST 2004), pp. 185-188.

B. Taskar, et al., Max-margin parsing, 2004, 8 pages, In Empirical Methods in Natural Language Processing (EMNLP04).

S. Mao, et al., Document structure analysis algorithms: A literature survey, Jan. 2003, vol. 5010, pp. 197-207, In Proc. SPIE Electronic Imaging.

M. Krishnamoorthy, et al., Syntactic segmentation and labeling of digitized pages from technical journals, 1993, IEEE Transactions on Pattern Analysis and Machine Intelligence, vol. 15, 737-747.

J. Kim, et al., Automated labeling in document images, Jan. 2001, pp. 1-12, In Document Recognition and Retrieval VIII, vol. 4307. Available online at http://archive.nlm.nih.gov/pubs/kim/spie2001/spie2001.pdf, last checked Apr. 2, 2006.

D. Niyogi, et al., Knowledge-based derivation of document logical structure, 1995, pp. 472-475, In Third International Conference on Document Analysis and Recognition, Montreal, Canada.

A. Conway, Page Grammars and Page Parsing: A Syntactic Approach to Document Layout Recognition, 1993, In Proceedings of the 2nd International Conference on Document Analysis and Recognition, Tsukuba Science City, Japan, pp. 761-764.

E.G. Miller, et al., Ambiguity and constraint in mathematical expression recognition, 1998, 8 pages, In Proceedings of the National Conference of Artificial Intelligence. American Association of Artificial Intelligence.

T. Tokuyasu, et al., Turbo recognition: a statistical approach to layout analysis, 2001, in Proceedings of the SPIE, San Jose, CA, vol. 4307, pp. 123-129.

T. Kanungo, et al., Stochastic language model for style-directed physical layout analysis of documents, 2003, pp. 583-596, In IEEE Transactions on Image Processing, vol. 5, No. 5.

D. Blostein, et al., Applying compiler techniques to diagram recognition, In Proceedings of the 16th International Conference on Pattern Recognition, 2002, vol. 3, pp. 123-136.

J. F. Hull, Recognition of mathematics using a two dimensional trainable context-free grammar, Master's thesis, MIT, Jun. 1996, 101pages.

N. Matsakis, Recognition of handwritten mathematical expressions, May 1999, pp. 1-59, Master's thesis, Massachusetts Institute of Technology, Cambridge, MA.

J. Lafferty, et al., Conditional Random Fields: Probabilistic Models for Segmenting and Labeling Sequence Data, 2001, In Proceedings of the 18th International Conference on Machine Learning, Morgan Kaufmann, San Francisco, CA, pp. 282-289.

E. Charniak, et al., Edge-Based Best-First Chart Parsing, 1998, In Proceedings of the 14th National Conference on Artificial Intelligence, pp. 127-133.

D. Klein, et al., A* parsing: Fast Exact Viterbi Parse Selection, Stanford University, 2001, 8 pages, Tech. Rep. dbpubs/2002-16.

Y. Freund, et al., A Decision-Theoretic Generalization of On-line Learning and an Application to Boosting, 1995, In Computational Learning Theory: Eurocolt '95, Springer-Verlag, pp. 23-37.

I. Philips, et al., Cd-rom Document Database Standard, In Proceedings of the 2nd International Conference on Document Analysis and Recognition (ICDAR), 1993, pp. 478-483.

P. Viola, et al., Rapid Object Detection Using a Boosted Cascade of Simple Features, 2001, pp. 1-9, In Proceedings of the IEEE Conference on Computer Vision and Pattern.

T. Breuel, High Performance Document Layout Analysis, 10 pages, In 2003 Symposium on Document Image Understanding Technology, Greenbelt Maryland.

R. Zanibbi, et al., A Survey of Table Recognition: Models, Observations, Transformations, and Inferences, International Journal of Document Analysis and Recognition, 2004, vol. 7, No. 1, pp. 1-16.

K. F. Chan, et al., Mathematical Expression Recognition: A Survey, 2000, International Journal on Document Analysis and Recognition, vol. 3, pp. 3-15.

E. Charniak, Statistical Techniques for Natural Language Parsing, AI Magazine, 1997, vol. 18, No. 4, pp. 33-44.

M. Kay, Chart Generation, In Proceedings of the 34th Annual Meeting of the Association for Computational Linguistics (ACL '96), Santa Cruz, California, 1996, pp. 200-204.

M. Viswanathan, et al., Document Recognition: An Attribute Grammar Approach, Mar. 1996, In Proc. SPIE vol. 2660, Document Recognition III, Vincent/Hull, Eds., pp. 101-111.

C.D. Manning, et al., Foundations of Statistical Natural Language Processing. The MIT Press, 1999, pp. 1-3.

Tobias Schefer, et al., Active Hidden Markov Models For Information Extraction, In Advances in Intelligent Data Analysis, 4th International Conference, IDA 2001, pp. 309-318.

P. Chou, Recognition Of Equations Using a 2-D Stochastic Context-Free Grammar, In SPIE Conference on Visual Communications and Image Processing, Philadelphia, PA, 1989, pp. 852-863.

M. Kay, Algorithm Schemata And Data Structures In Syntactic Processing, 1986, pp. 35-70.

Michael Shilman, et al., Spatial Recognition and Grouping of Text and Graphics, Eurographics Workshop on Sketch-Based Interfaces and Modeling, 2004, 5 pages, Hughes/Jorge, Eds.

Michael Shilman, et al., Recognition and Grouping of Handwritten Text in Diagrams and Equations, IWFHR 2004, Sep. 2004, pp. 69-77, Toyko, Japan.

Michael Shilman, et al., Recognizing Freeform Digital Ink Annotations, IAPR International Workshop on Document Analysis Systems, Sep. 8-10, 2004, 12 pages, Florence, Italy.

R. Hauck. Partial European Search Report. Apr. 15, 2005, 2 pages, Munich, Germany.

Sriram Ramachandran and Ramanujan Kashi, "An Architecture for ink Annotations on Web Documents", Proceedings of the Seventh International Conference on Document Analysis and Recognition, Aug. 3-6, 2003 pp. 256-260 vol. 1 Retrieved from IEEE Xplore on Sep. 27, 2006.

Ivan Poupyrev, Numada Tomokazu and Suzanne Weghorst, "Virtual Notepad: Handwriting in Immersive VR", IEEE, Proceedings of VRAIS' Atlanta, Georgia, Mar. 1998 Retrieved from CiteSeer on Sep. 28, 2006.

Marcel Gotze, Stefan Schlechtweg and Thomas Strothotte, "The Intelligent Pen—Toward a Uniform Treatment of Electronic Documents", 2002 Retrieved from CiteSeer on Sep. 28, 2006.

Murphey, et al. "Neural Learning Using AdaBoost" (2001) IEEE, 6 pages.

Bargeron et al, "Reflowing Digital Ink Annotations," Paper: Techniques for On-screen Shapes, Text and Handwriting. CHI 2003, Apr. 5-10, 2003, Ft. Lauderdale, Florida, USA., vol. 5, Issue No. 1, pp. 385-392. http://www.dgp.toronto.edu/~tomer/store/papers/reflowchi03.pdf. Last accessed Nov. 4, 2008, 8 pages.

Ellis et al, "A Collaborative Annotation System for Data Visualization," Proceedings of the working conference on Advanced Visual Interfaces, May 25-28, 2004, ACM 1-58113-867-9/04/0500, pp. 411-414. http://delivery.acm.org/10.1145/990000/989938/p411-ellis.pdf? key1=989938&key2=1838085221&coll=GUIDE&dl=GUIDE&CFID=9420863&CFTOKEN=15500950. Last accessed.

Ihsin Phillips, et al., "CD-ROM Document Database Standard" Proc. Second Int'l Conf. on Document Analysis and Recognition, 1993, pp. 478-483. http://ieeexplore.ieee.org/stamp/stamp.jsp?arnumber=395691&isnumber=8972. Last accessed Nov. 4, 2008, 6 pages.

OA Dated Jul. 25, 2008 for U.S. Appl. No. 11/171,064, 15 pages.
OA Dated Jul. 28, 2008 for U.S. Appl. No. 10/934,306, 34 pages.
OA Dated Oct. 21, 2008 for U.S. Appl. No. 10/927,452, 22 pages.

* cited by examiner

LIFTING INK ANNOTATIONS FROM PAPER

CROSS REFERENCE TO RELATED APPLICATIONS

This application is related to co-pending U.S. application Ser. No. 10/927,452, entitled, "Spatial Recognition and Grouping of Text and Graphics", filed on Aug. 26, 2004, co-pending U.S. patent application Ser. No. 10/758,370, entitled, "IMAGE-BASED DOCUMENT INDEXING AND RETRIEVAL", filed on Jan. 15, 2004, co-pending U.S. patent application Ser. No. 10/934,306, entitled, "FREEFORM DIGITAL INK ANNOTATION RECOGNITION", filed on Sep. 3, 2004, and co-pending U.S. patent application Ser. No. 11/095,393, entitled, "SYSTEMS AND METHODS FOR DETECTING TEXT", filed on Mar. 31, 2005.

BACKGROUND

Advancements in computing and communications technology have significantly altered business practices regarding document creation and use. In business and personal environments, however, a substantial amount of reviewing and/or editing is still completed on printed documents. Many individuals prefer reading and/or editing documents on paper as opposed to reading and/or editing on a computer display. Nonetheless, it is often important to capture and/or track the significant amount of information that individuals add to their printed documents by using annotations and/or revisions.

In a business or personal environment where a substantial number of documents are printed, keeping track of important handwritten annotations and revision markings is problematic. Printed documents are easily lost or damaged. For example, a document can be printed and distributed at a meeting, and those attending the meeting can make annotations on the documents using a pen, pencil, highlighter, or other marking tool to capture their thoughts regarding the meeting in connection with information in the document. The document may then be folded, smudged, torn, and/or damaged in another similar manner as it is placed in a folder and transported from the meeting to a different location. Thereafter the document can lie within a stack of other documents for hours, days, months, or indefinitely.

If the handwritten annotations or revisions on a printed document are desired for later use, a significant amount of time can be required to locate a lost or misplaced document or to decipher the markings on a damaged document. Furthermore, if the annotations or revisions are meant to be applied to an electronic version of the document, significant effort must be expended to manually incorporate that information into the electronic version.

Other scenarios also exist in which it is important to capture the information added to a printed document via handwritten annotations and revisions. For instance, a vendor can prepare and fax a draft purchase order to a customer, and upon receipt of that purchase order the customer can modify contents of the faxed document by physically modifying the document using a pen or other suitable marking tool. Thereafter, the customer can relay the modified document back to the vendor by transmitting a copy using a facsimile machine. The vendor must then manually capture the new information added by the customer into his purchase order tracking system in order to make use of it. Thus in this case as well, additional effort must be expended to capture or otherwise use additional information in the form of handwritten alterations to the original document, else that information can easily be lost.

Existing systems for capturing handwritten information added to printed documents rely on special electronic hardware. Pressure-sensitive tablets record pen strokes on commodity paper pages, however the user must take care to inform the tablet when a new page has been placed on the tablet, else the tablet will record all strokes as if they belong to the previous page. Even when the tablet is properly informed of the page, it is still not aware of the page's contents, and thus it records no information about how the pen strokes relate to them.

Pens with embedded accelerometers attempt to record the physical trajectory of the pen tip, and thus record what is being written with them. However, such devices are also unaware of the contents of the page being written upon. In fact, such devices have no way to recognize the difference between pages at all. Instead, all writing surfaces are implicitly assumed to be part of one continuous surface. Pens with embedded cameras record the relationship between the pen tip's movements and a special proprietary micro pattern that is printed on the paper page. The pen can record the exact relationship of pen strokes to positions on a page, and can automatically discern the difference between pages based on the differences in the micro pattern. However, only paper with the special micro pattern printed on it can be used, thus requiring users to use not only a special pen, but special paper as well. Currently, there does not exist a system for capturing handwritten annotations and/or revision markings made on printed documents that allows the reader to use any pen and any paper of his/her choosing.

SUMMARY

The following presents a simplified summary in order to provide a basic understanding of some aspects of the disclosed and described components and methods associated with those components. This summary is not an extensive overview. It is neither intended to identify key or critical elements nor delineate scope. Its sole purpose is to present some concepts in a simplified form as a prelude to the more detailed description that is presented later. Additionally, section headings used herein are provided merely for convenience and should not be taken as limiting in any way.

A comparator discerns differences between an initial version of a document and an image of a printed document that contains handwritten or other annotations. By detecting difference between the initial version and the image, the comparator can isolate annotations. An annotation lifter can then extract the annotations and convert them into a digital form.

An annotation lifting system can extract electronic versions of handwritten annotations from an image of a printed document. The system can preprocess the image to improve its quality. The system can then use recognizable features of machine-printed text to identify such text and subtract it from the image. A component can identify and remove portions of machine-printed text that overlap with annotations. A joining component connects and/or joins discontinuous sections of an annotation. The system can digitize the annotations to place them in a form that is readily usable by a computer.

A document creation and annotation system can create electronic documents and produce printed copies. At or around the time the document is printed, a baseline original image of the document is created and stored. A signature component uses properties of the image to create a signature for the image. Any annotations placed upon the printed copy can be captured in an annotated image of the printed document. That annotated image can be sent to a search engine that can create a signature for the annotated image. The signature is compared to signatures of other documents in a data store to find a match. If a match is found, the matching original image is used to subtract text from the annotated image so that only the annotations remain. If no match is found, the system subtracts text by feature recognition. Any remaining annotations are converted to digital versions.

The disclosed and described components and methods comprise the features hereinafter fully described and particularly pointed out in the claims. The following description and the annexed drawings set forth in detail certain illustrative aspects. These aspects are indicative, however, of but a few of the various ways in which the disclosed components and methods can be employed. Specific implementations of the disclosed and described components and methods can include some, many, or all of such aspects and their equivalents. Variations of the specific implementations and examples presented herein will become apparent from the following detailed description when considered in conjunction with the drawings.

DETAILED DESCRIPTION

Figure 1:
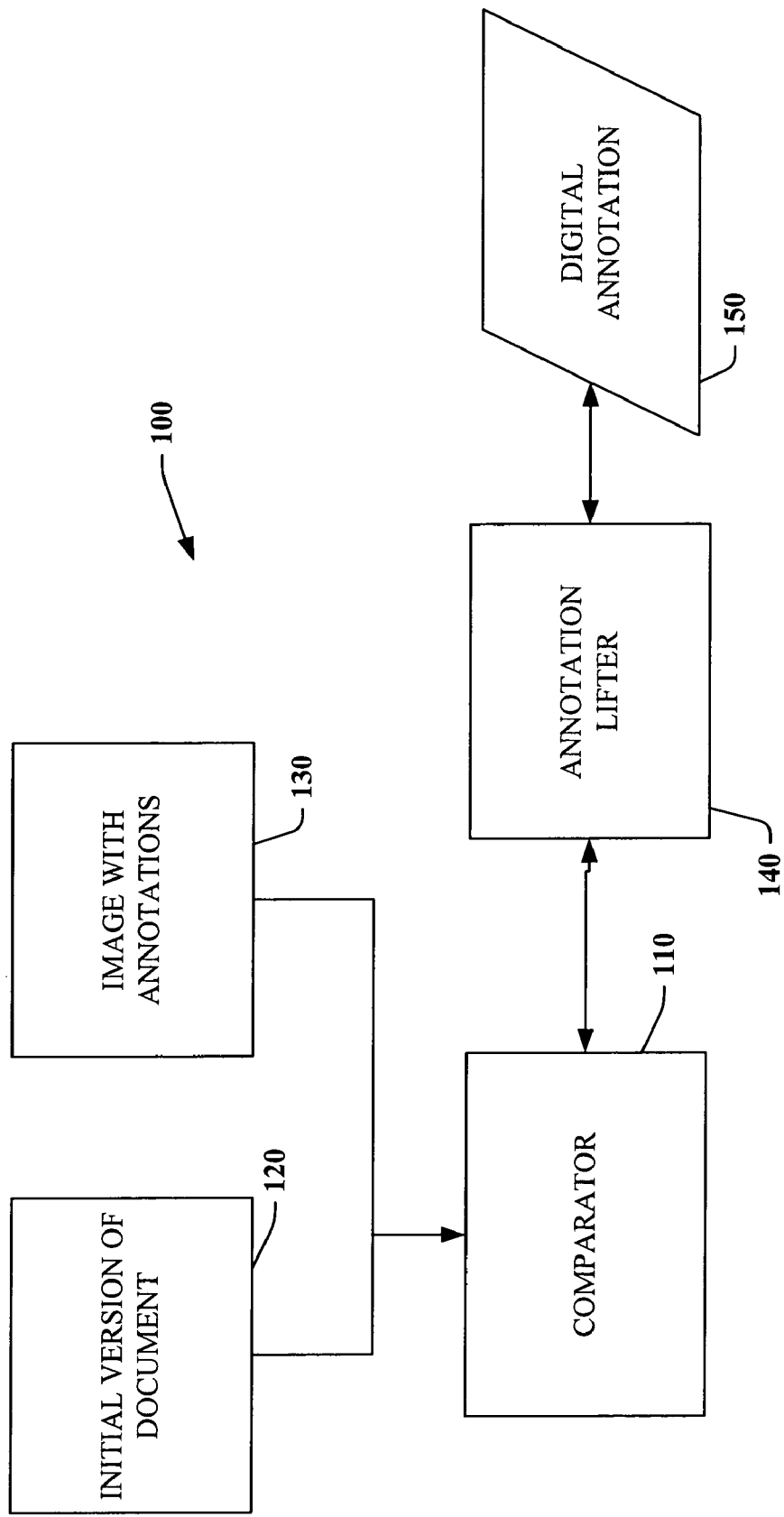
FIG. 1 is a system block diagram of an annotation lifting system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

Artificial intelligence based systems (for example, explicitly and/or implicitly trained classifiers) can be employed in connection with performing inference and/or probabilistic determinations and/or statistical-based determinations as described hereinafter. As used herein, the term "inference" refers generally to the process of reasoning about or inferring states of the system, environment, and/or user from a set of observations as captured by events and/or data. Inference can be employed to identify a specific context or action, or can generate a probability distribution over states, for example. The inference can be probabilistic.—For example, an inference can include the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (for example, support vector machines, neural networks, expert systems, Bayesian belief networks, fuzzy logic, data fusion engines, or other similar systems) can be employed in connection with performing automatic and/or inferred actions.

Furthermore, the disclosed and described components can be implemented as a method, apparatus, or article of manufacture using standard programming and/or engineering techniques to produce software, firmware, hardware, or any combination thereof to control a computer. The term "article of manufacture" as used herein is intended to encompass a computer program accessible from any computer-readable device, carrier, or media. For example, computer readable media can include but are not limited to magnetic storage devices (such as hard disks, floppy disks, magnetic strips, or other types of media), optical disks (such as compact disks (CDs), digital versatile disks (DVDs), or other similar media types), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed and described components and methods.

FIG. 1 is a system block diagram of an annotation lifting system 100. The annotation lifting system 100 includes a comparator 110. The comparator 110 can access an initial version 120 of a document and an image of that same document 130. The initial version 120 of a document can be a text version from which an image can be created, such as during printing of the initial version 120 of the document, can be an image of the document, or can be another suitable format. The image 130 of the document includes annotations, such as handwritten interlineations, strike-outs, margin notes, emphasis highlighting by using a highlighting marker or by underlining, circling, or the like, and standard proofreading marks, among others. Annotations also include typewritten, stamped, or printed information placed over, near, or around original text.

The comparator 110 can compare the initial version 120 of the document with the image 130 of the document including annotations to identify differences between the initial version 120 of the document and the image 130 of the document. Those differences are annotations. The comparator 110 sends information about such annotations to the annotation lifter 140. The annotation lifter 140 can recognize individual annotations by using a handwriting recognition component, by using an artificial-intelligence based component for pattern-matching, by referencing pre-defined annotation symbols, or by another suitable means. Annotations recognized by the annotation lifter 140 are converted to a digital representation that can be used by a computer and stored as an annotation 150 for future use.

Electronic storage of annotations has a number of benefits over simply storing an image of an annotated document. One example is that it is possible to display the document both with and without annotations so that versions can be readily compared. Additionally or alternatively, individual annotations can be displayed or hidden to assist a user in focusing on a specific annotation. Also, additional content may be added to the original document, and the electronically stored annotations can be made to adapt to the new contents (e.g. so that they appear in the correct location within the document). Also, electronically stored annotations can be recognized as "commands" which have an effect on underlying document contents (such as strikethroughs and inserts), and each one can be executed individually. Finally, the necessity of storing two separate versions of the same document, both with and without annotations, can be eliminated.

In operation, the annotation lifting system 110 can automatically recognize and lift annotations from documents containing handwritten or other annotations. An original version of a document can be printed for review by a user. At or near the time of printing, an image capture component (not shown) can capture an image of the document to use as a baseline reference, such as initial version 120 of the document. That image can be a true representation of an appearance of the document as printed or can be processed in accordance with one or more image processing algorithms.

A version of the document including annotations can be imaged by using a digital camera, a document scanner, or another suitable device to create the image 130 that includes annotations. The comparator 110 can then identify the annotations by performing image subtraction using the initial version 120 of the document as a baseline reference or by another appropriate method. The comparator 110 can send information about the annotations, for example, in the form of an image after subtraction, to the annotation lifter 140. The annotation lifter 140 can then isolate individual annotations in the image and package each annotation into a digital version 150 of the annotation.

Figure 2:
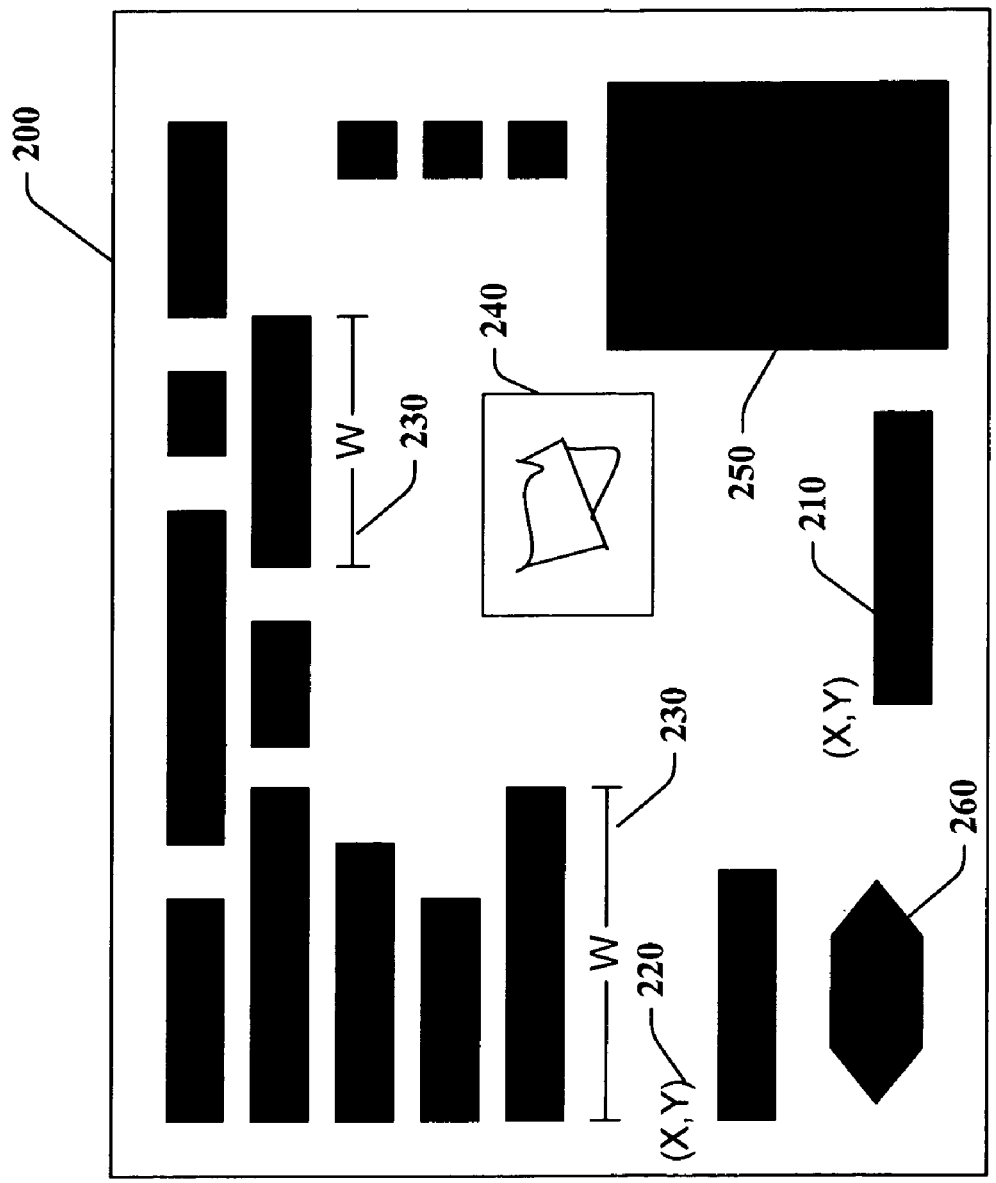
FIG. 2 is a diagram of a sample document layout.

FIG. 2 is a diagram of a document layout image 200. The document from which the document layout image 200 can be derived can include text, photographs, logos, graphs, charts, line art, or any other content that can be placed on a printed page. Upon printing of the document by a component of a print driver, for example, the document layout image 200 can be created for use as a baseline reference during further processing. The document layout image 200 is depicted after further processing to identify key elements of the document layout image 200. The document layout image 200 comprises a group of words 210. A word layout can be defined by defining a location, such as an (x, y) coordinate pair 220, and a width of each word, such as width 230, within the document layout image 200. In this example, the document layout image 200 also includes a line art drawing 240. Similarly, a photograph 250 and a logo 260 are also included. The document layout image 200 depicts some, but not all, of the elements typically included on a printed page.

Figure 3:
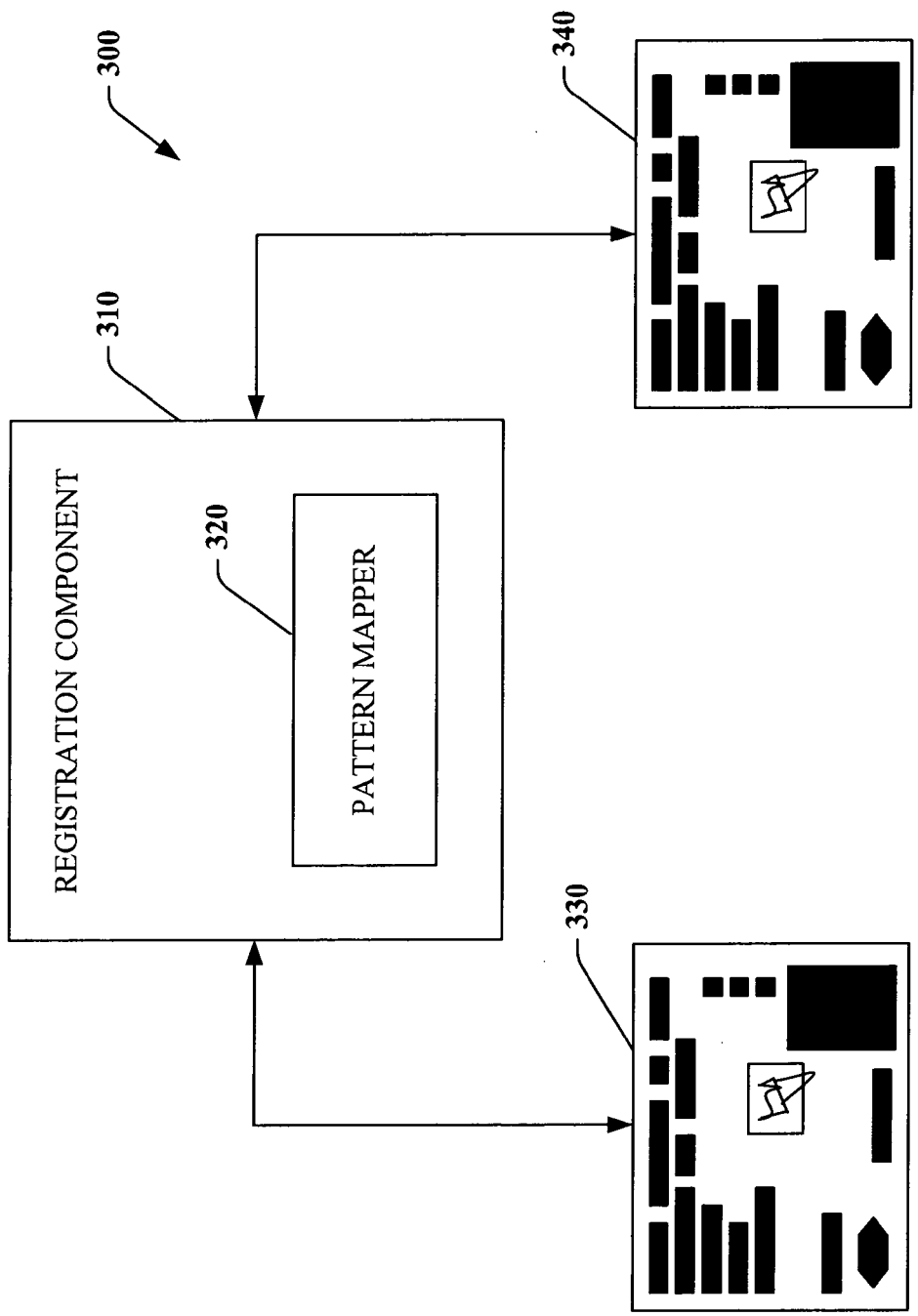
FIG. 3 is a system block diagram of a registration system.

FIG. 3 is a system block diagram of a registration system 300. The registration system 300 includes a registration component 310 that can register an image with one or more other images. The registration component 310 includes a pattern mapper 320 that can map a pattern or portion of a pattern of one image onto a corresponding pattern or portion of a pattern of another image. The registration component 310 can access a first image 330 and a second image 340 to register the two images.

Registration is a process by which similar images are aligned for further processing, such as image subtraction, by identifying corresponding points in each image. One simple technique involves having a subject of an image remain perfectly still as images are taken. Additionally, the imaging device used remains perfectly still. Because both the imaging device and the subject remained stationary, the images should automatically register.

A more sophisticated approach involves identifying edges of structures in each image and aligning corresponding edges. Various edge and contour recognition algorithms can be employed. In specific examples presented here, features of document layout images, such as those discussed in conjunction with FIG. 2, can be registered by correlating locations of words, line art, photographs, logos, and other image features in the document layout images.

In operation, the registration component 310 accesses features of the first image 330 and the second image 340 to discern identifying features such as word locations. The pattern mapper 320 identifies corresponding words in each image 330, 340 and maps locations of words in the first image 330 to corresponding locations of words in the second image 340. After a sufficient number of words of the first image 330 have been mapped to words of the second image 340 to ensure that the two images 330, 340 are properly aligned with respect to each other, registration is complete. Although it is possible to map every pixel of an image onto a corresponding pixel of another image, it is usually only necessary to map a subset of all available pixels, depending upon the specific algorithm or approach employed.

Figure 4:
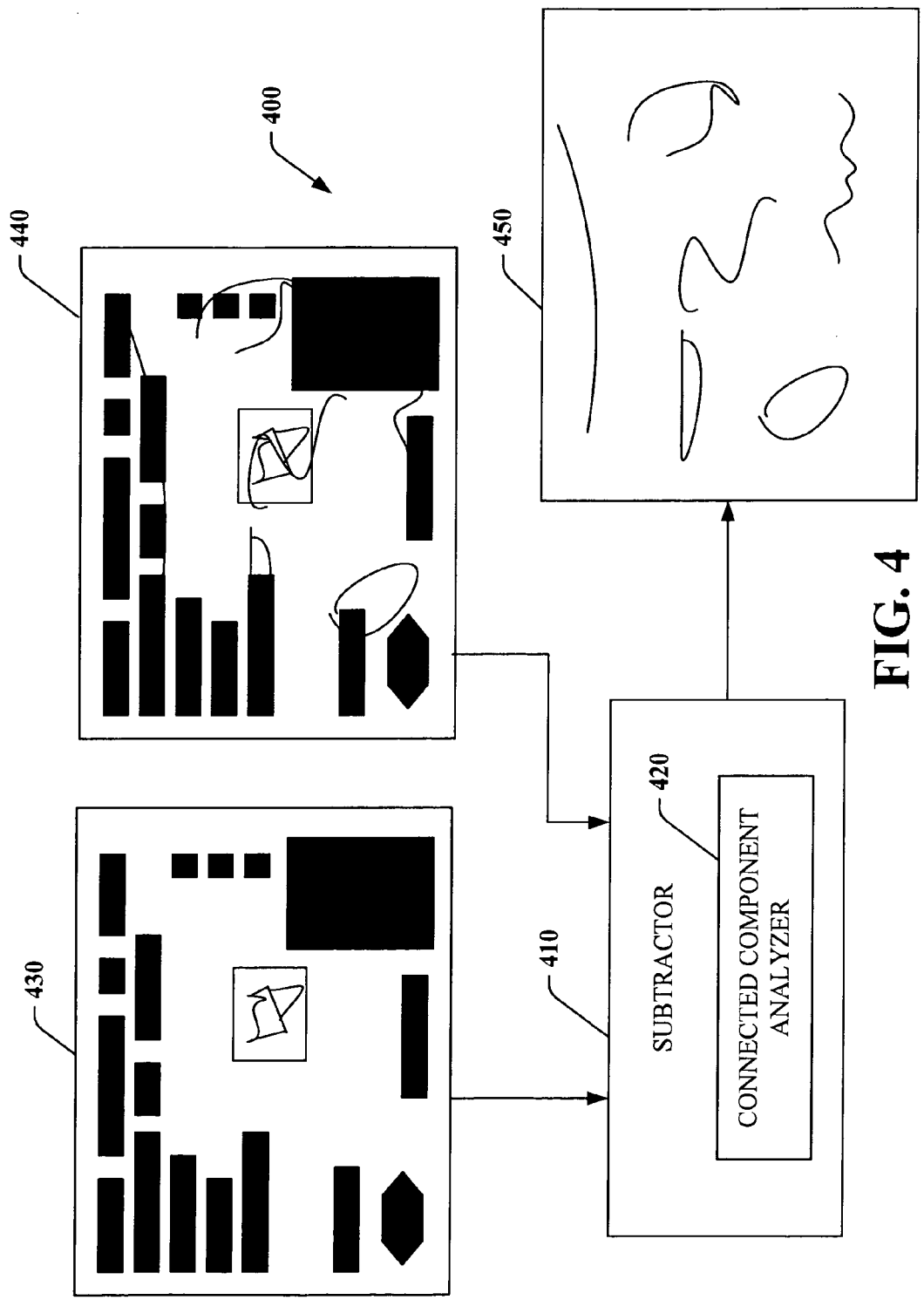
FIG. 4 is a system block diagram of an image subtractor.

FIG. 4 is a system block diagram of an image subtraction system 400 in accordance with another aspect of the invention. The image subtraction system 400 includes an image subtractor 410 that includes a connected component analyzer 420. The image subtractor 410 can access an initial image 430 of a document and an image 440 of a document that includes annotations. The initial image 430 of the document includes typewritten text and other content, suitable for inclusion in a printed page such as charts, graphs, photographs, line art, and logos, among others. The image 440 of the document that includes annotations includes typewritten text and handwritten or other annotations. The image subtractor 410 can subtract the initial image 430 from the image 440 that includes annotations to create an image 450 that includes only the handwritten or other annotations.

Preprocessing of the image 440 of the document that includes annotations can assist during image subtraction as well as during other phases of operation, such as during image registration. Procedures such as white balancing, Bayer's effect removal, skew, affine, and perspective distortion, and noise removal can greatly enhance or improve image quality. Anything that improves image quality is generally helpful during image processing.

During white balancing, areas of an image that should be white, but for various reasons are not, are adjusted to make those areas white. Colors of other regions can be adjusted accordingly. Bayer's effect distorts colors in the image and can strongly affect black. Bayer color filtering is applied to color-correct the image. The image of the document can show the document in a spatial orientation that is other than perfectly flat and square. Skew, affine, and perspective correction adjusts the spatial orientation of the document in the image. Finally noise removal is applied to remove image noise added from various sources. Types of noise removed include salt-and-pepper speckling, and imperfections from an input device such as a scanner of digital camera, among others.

As previously described, when an initial version of a document is available, annotations can be readily separated from original printed text using an image subtraction process. Separating annotations from original text is somewhat more difficult when an initial version of the document is not available for image subtraction. In that case, other techniques and systems can be employed to identify machine-printed text and separate annotations from that text.

In this case, preprocessing of the image can enhance image quality. The image can then be analyzed to segment highlighter markings. Assuming that the document as initially printed was on a light-colored paper with dark-colored text, highlighting can be identified by converting the image of the document to grayscale and analyzing pixel values. Pixels affected by highlighting have a darker gray value than those of the plain paper, but a lighter gray value than the text pixels. Choosing a dynamic threshold for pixel values can assist in segmenting highlighting marks.

Removal of text is next. Such removal takes advantage of the fact that machine printed text is substantially uniform as compared to typical handwriting. Most machine-printed text can be removed by using factors such as frequency of height and width of characters, as well as layout information to recognize margin areas based upon horizontal and vertical profiles. Once such text is removed, what remains are annotations, figures, or characters that touch or overlap annotations or figures. Figures can be treated as annotations for purposes of subtracting text.

The connected component analyzer 420 can assist in removing overlapping characters. The connected component analyzer 420 can perform a connected component analysis in three dimensional space, based upon two dimensional space and curvature, and perform a graph analysis to identify all points where annotations overlap text. This can be achieved by focusing on pixels with a degree greater than two. What remains after processing are the annotations.

The process of lifting annotations has at least three uses. First, the original document can be restored. When restoring a document that includes annotations, any annotations can be removed from the pages of the document, leaving only the original content. Additionally or alternatively, if multiple layers of annotations or a series of sets annotations made over time exist on the document, each layer or individual set of annotations can be removed to create a partially annotated version of the document. Second, the document layout can be reflowed using word bounding boxes. In cases when annotations are used to change content in the original document, such as with the use of proofreading and editing marks, layout of the original content of the document can be adjusted to accommodate any changes made. Third, the entire document, including annotations, can be revived. All annotations can be preserved and applied to the document for recording or archiving purposes. Additional uses are possible.

Figure 5:
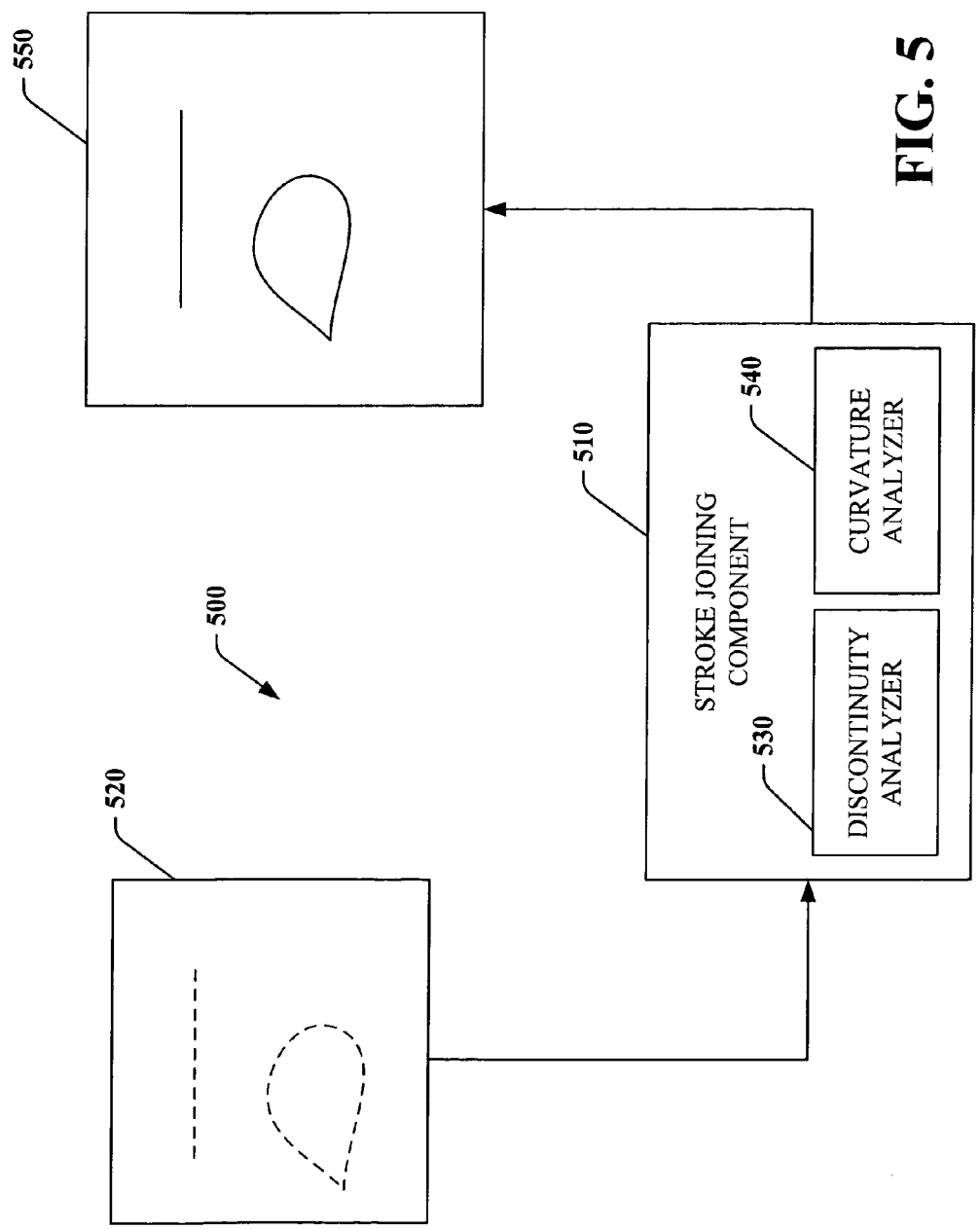
FIG. 5 is a system block diagram of an annotation stroke joiner.

FIG. 5 is a system block diagram of an annotation stroke joining system 500. The annotation stroke joining system 500 can be implemented as part of a subtractor, such as the subtractor 410 discussed in conjunction with FIG. 4. As part of that or another implementation, the annotation stroke joining system 500 includes a stroke joining component 510. The stroke joining component 510 can access an image 520 that includes annotations lifted from a document. The stroke joining component 510 includes a discontinuity analyzer 530 and a curvature analyzer 540. The discontinuity analyzer 530 identifies discontinuous regions between annotation strokes. The curvature analyzer determines, based upon curvature of discontinuous strokes, whether such discontinuous strokes are in fact parts of a single stroke that should be joined. If so, the stroke joining component joins the discontinuous parts by filling in pixels between the discontinuous parts. An image 550 that contains joined strokes results from operation of the stroke joining component 510.

Stroke joining can be an important part of annotation lifting. Annotation marks can be incomplete or damaged because of a variety of factors. For example, an image subtraction process may create discontinuities in annotations where an annotation mark overlaps part of the subtracted image. Someone may have bumped into the annotator while he was writing. The writing instrument used by the annotator may have malfunctioned and caused discontinuities in strokes. The annotation may have been defaced by accident or abuse. Stroke joining can make intelligible annotations out of formerly unintelligible symbols.

The disclosed and described components, for example in connection with identification tasks, handwriting analysis tasks, and searching tasks, among others, can employ various artificial intelligence-based schemes for carrying out various aspects thereof. For example, the stroke joining component 510 can use pattern-matching abilities of an artificial intelligence-based component to determine whether to join line segments as a single stroke.

A classifier is a function that maps an input attribute vector, $X=(x_1, x_2, x_3, x_4, \ldots x_n)$, to a confidence that the input belongs to a class, that is, $f(X)=$confidence(class). Such classification can employ a probabilistic and/or statistical-based analysis (for example, factoring into the analysis utilities and costs) to prognose or infer an action that a user desires to be automatically performed. In the case of software component replacement systems, for example, attributes can be file descriptors such as filenames, signatures, hash functions, upgrade codes, compatibility codes, version numbers, build numbers, release dates, or other data-specific attributes derived from the device driver files and the classes are categories or areas of interest, for example, descriptors of other device drivers that the device driver can update.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to, training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the stroke joining component 510, as well as other components disclosed and described herein, can employ classifiers that are explicitly trained (for example, by a generic training data) as well as implicitly trained (for example, by observing user behavior, receiving extrinsic information). For example, SVM's are configured by a learning or training phase within a classifier constructor and feature selection module. Thus, the classifier(s) can be used to automatically perform a number of functions, including but not limited to determining whether a device should be sent data.

Figure 6:
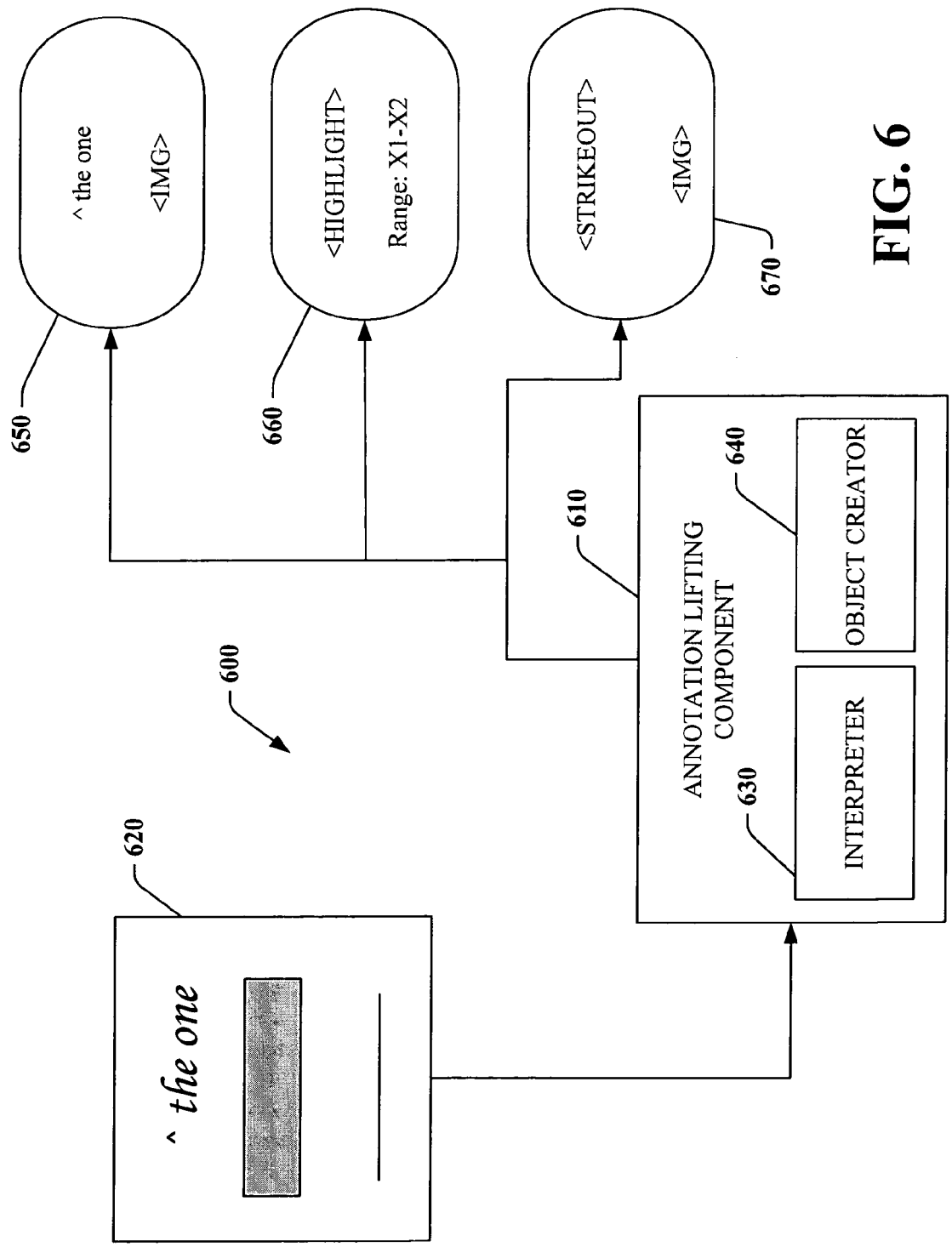
FIG. 6 is a system block diagram of an annotation lifter.

FIG. 6 is a system block diagram of an annotation lifting system 600. The annotation lifting system 600 includes an annotation lifting component 610. The annotation lifting component 610 can access an image 620 that includes annotations from a document that remained after prior processing, such as processing in accordance with previously-described systems and techniques. In this example, the image 620 includes three annotations. The first is a proofreading insert mark followed by text. The second is highlighting. The third is a horizontal strikethrough.

The annotation lifting component 610 includes an interpreter 630 and an object creator 640. The interpreter can analyze annotations included in the image 620 to determine a type of a specific annotation, such as handwriting, highlighting, strikeouts, or another type. Such determinations can be made by rules- or heuristic-based components or by an artificial intelligence component that has been trained to classify annotations into predefined categories.

The interpreter 630 can send information regarding an annotation to the object creator 640. The object creator 640 can take that information and digitize the annotation by creating a computer-understandable object that has attributes of the annotation. Such digitized annotations can be inserted into an electronic version of the document from which such annotations were lifted, can be stored separately from the document, or can be otherwise manipulated.

For example, an annotation object 650 possesses attributes of an original annotation from the image 620. Specifically, the original annotation from the image 620 included a proofreading insertion mark. The interpreter 630 recognized the annotation as containing handwriting and extracted text from that handwriting. The interpreter 630 passed that information to the object creator 640 which digitized the annotation by creating the annotation object 650. The annotation object 650 includes the text extracted from the handwriting by the interpreter 630. The annotation object 650 also includes an image of the actual handwriting.

In another example, an annotation object 660 possesses attributes of an original annotation from the image 620. Specifically, the original annotation from the image 620 included a highlighting mark. The interpreter 630 recognized the annotation as a highlighting mark and determined an area associated with that mark. The interpreter 630 passed that information to the object creator 640 which digitized the annotation by creating the annotation object 660. The annotation object 650 includes a tag created by the interpreter 630 that designates that the annotation object 660 includes a highlighting mark. The annotation object 660 also includes a range for the size of the highlighting.

A further example is shown in an annotation object 670 which also possess attributes if an original annotation from the image 620. Specifically, the original annotation from the image 620 included a proofreading strikethrough mark. The interpreter 630 recognized the annotation as containing a proofreading strikethrough mark and passed that information to the object creator 640. The object creator 640 digitized the annotation by creating the annotation object 670. The annotation object 650 includes a tag that indicates that the annotation object 670 includes a strikeout mark. An image of the strikeout mark is also included in the annotation object 670.

Figure 7:
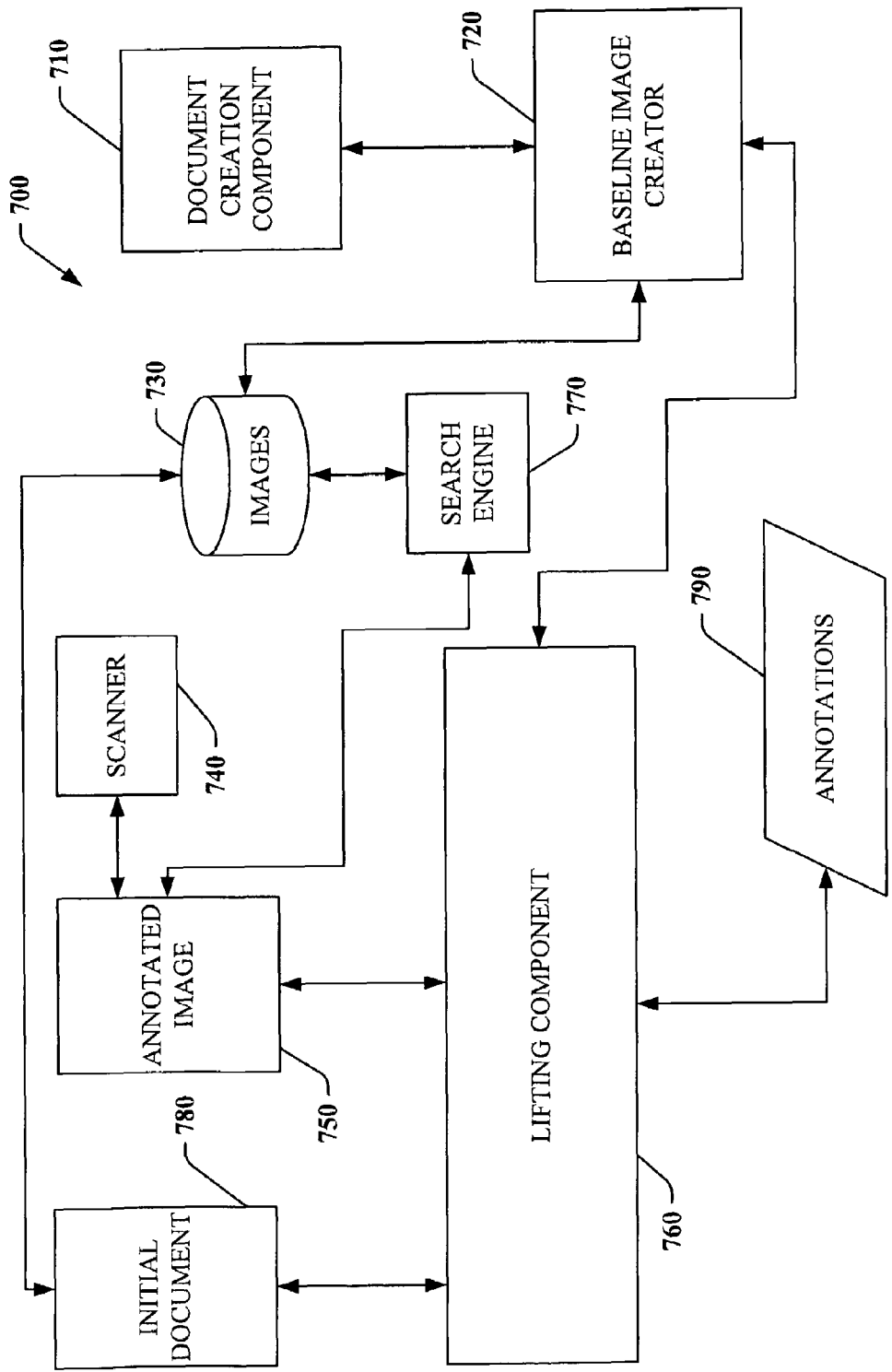
FIG. 7 is a system block diagram of a document annotation lifting system.

FIG. 7 is a system block diagram of a document annotation lifting system 700. The document annotation lifting system 700 is depicted as part of an end-to-end system. That is, the entire end-to-end system that includes document annotation lifting components can create initial documents that a user can annotate. The system also, automatically or with a minimal amount of human interaction, can recognize and extract handwritten or other annotations 790 on paper documents. It should be noted that although this example depicts annotation lifting components as part of an end-to-end document creation system such as a word processing system, other types of end-to-end systems with annotation lifting components can be created. For example, annotation lifting components can be included in a photographic editing system, a document layout or publishing system, a financial system such as a spreadsheet-based system, or any other system that can make use of an ability to lift annotations 790 from documents.

The document annotation lifting system 700 includes a document creation component 710. The document creation component 710 can be a general-purpose computer running word processing software, a dedicated word processor, or another suitable device capable of creating electronic documents. The document creation component 710 can also include a printer for creating paper copies of electronic documents.

The document creation component 710 is operatively coupled to a baseline image creator 720. The baseline image creator 720 creates images of documents in unannotated form for later use in processing tasks. A modified printer driver can serve as the baseline image creator 720 by creating a bit-mapped or other image of a document as such document is printed. The baseline document creator 720 can then store the created baseline image in an image data store 730.

A user can make annotations on the printed document and return the printed document to the system for automatic lifting of annotations from the paper document. The user can feed the paper document into a feeder of a document scanner 740. It should be appreciated that a digital camera or similar device can be substituted for the document scanner 740. The document scanner 740 can create an image 750 of the annotated paper document for use in further processing.

The image 750 of the annotated paper document is sent to a lifting component 760. The lifting component 760 can include a variety of subsystems, such as a comparator, an image preprocessor, and image subtractor, an image registration component, and an annotation lifter, among others. The lifting component 760 issues a search request to a search engine 770 to locate a baseline version 780 of the document. The search engine 770 locates the baseline version 780 of the document in the image data store 730 and sends the baseline version 780 of the document to the lifting component 760.

With reference to the search engine 770, such component can be implemented as a system that facilitates automatic indexing and/or retrieval of an electronic version of a document based at least in part upon a digitized image of a printed document. It is to be understood that the electronic document can originate from a word-processor or other similar typing application, or alternatively originate from a pen and touch-sensitive screen. The system enables matching of electronic versions (for example, images) of such documents by utilizing topological properties of words that appear within the document.

The system includes a component, such as the baseline image creator 720, that facilitates generating an image of an electronic document that is resident in a data store, such as the image data store 730. The image of the electronic version of the document is stored in the image data store 730 to enable later retrieval of such image as well as other associated data (for example, the electronic version of the document, a URL that links that identifies a location of the electronic version of the document, or a tree representation, among others.

For example, the baseline image creator 720 can be a print driver that automatically generates the electronic image of a document when a user prints such document, and thereafter relays the image of the electronic version of the document to the image data store 730. Thus, at a substantially similar time that the document is printed, a bitmap of the document (or other suitable file format) is generated by the baseline image creator 720, and the image of the electronic version of the document and/or other associated information is stored within the image data store 730.

A user interface can be provided that enables a user to select particular documents of which to generate an image. For instance, a component can be provided that enables a user to toggle on and/or off an automatic image generation feature of the baseline image creator 720 (for example, similar to a "print to file" print option). Thus, the image data store 730 will include a plurality of images of electronic documents, wherein each image of an electronic document corresponds to at least a portion of a document that has been previously printed.

For example, each image can correspond to an individual page of the document. In an instance that the printed document contains no explicit information that informs a user of an identity of such printed document, the search system 770 can be employed to locate the corresponding image(s) within the image data store 730. For example, the printed document could be distributed at a meeting, and an attendee of the meeting may desire to locate an electronic version of the document to add modifications. Similarly, a user may have made various annotations on the printed document, and may simply desire to obtain a version of the document that does not include such annotations.

A digital image of the printed document can be obtained by using a scanner, digital camera, or other suitable device. Upon receiving the digital image, the search engine 770 searches the image data store 730 to locate the corresponding images of the electronic version of the printed document.

The image data store 730 can be employed to at least temporarily store the images of electronic documents as well as other data associated with the images. For example, that image data store 730 can conceptually be a relational database, wherein page images related to pages printed by a user can be considered as the primary entities. A plurality of disparate data can thereafter be associated with the images, such as signatures of the images, a hierarchical tree representation of the images, a URL that identifies a location of an electronic version of a document corresponding to one of the images, an electronic version of a document that existed at a time a corresponding image was printed (for example, which may be desirable in an instance that such document has been since modified), and other suitable information. Other embodiments, however, are contemplated and are intended to fall within the scope of the hereto-appended claims. For example, storage space may be at a premium, and it can become expensive to permanently store an electronic image of each page printed. In such an instance, the electronic images can be generated and temporarily stored to enable generation of the signatures. Thereafter the signatures can be the primary entities and be associated with URLs or other information that can be employed to obtain an electronic version of the document (or image of the document).

The value of the above-described components and methods is better appreciated by understanding the importance of recognizable annotations. While the vision of the paperless office remains a future goal, many technologies, including high-resolution displays, advances in digital typography, and the rapid proliferation of networked information systems, are contributing to a better electronic reading experience for users. One important area of enabling research is digital document annotation. Digital annotations persist across document versions and can be easily searched, shared, and analyzed in ways that paper annotations cannot.

Figure 8:
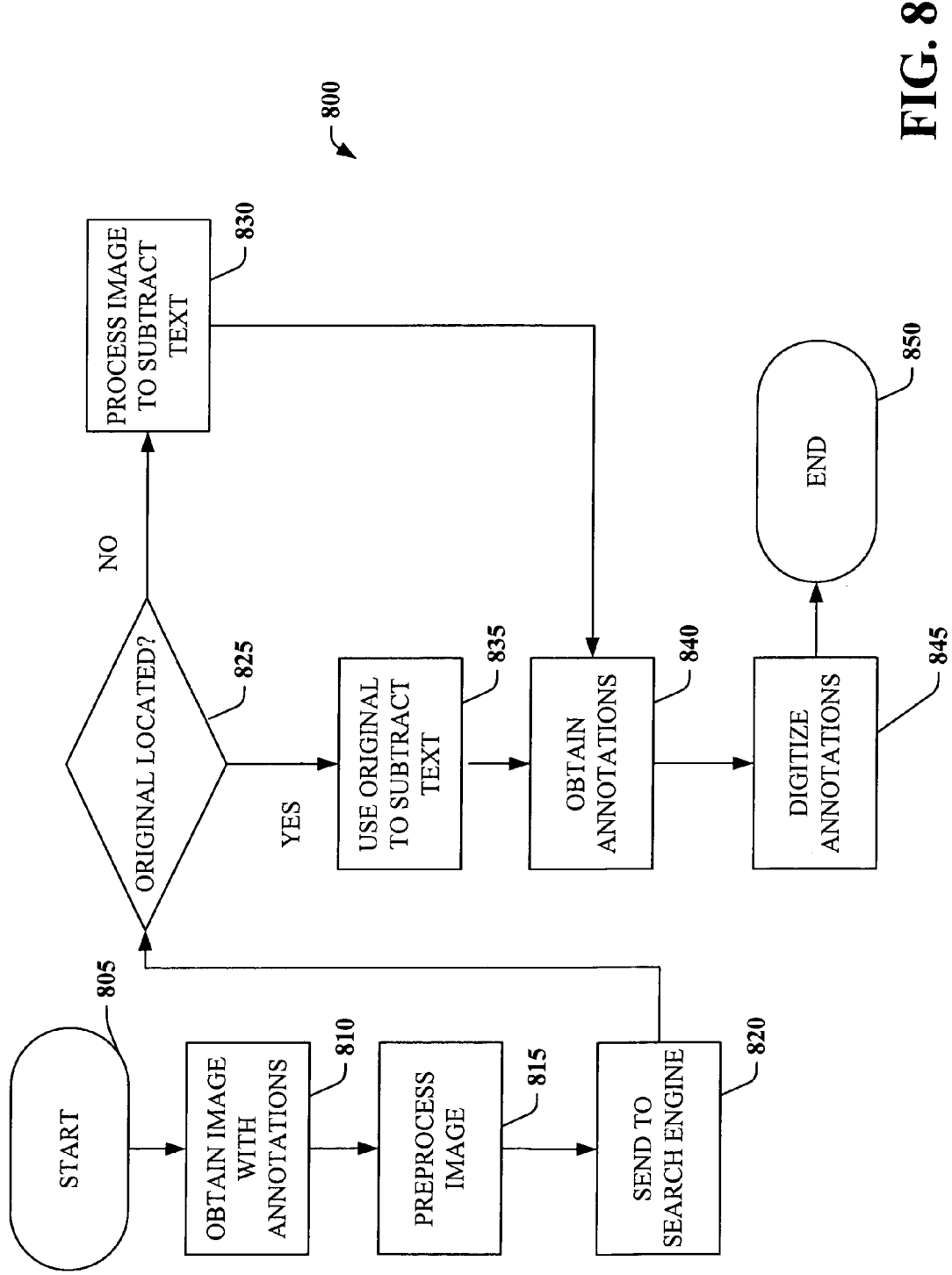
FIG. 8 is a flow diagram depicting a general processing flow.
Figure 9:
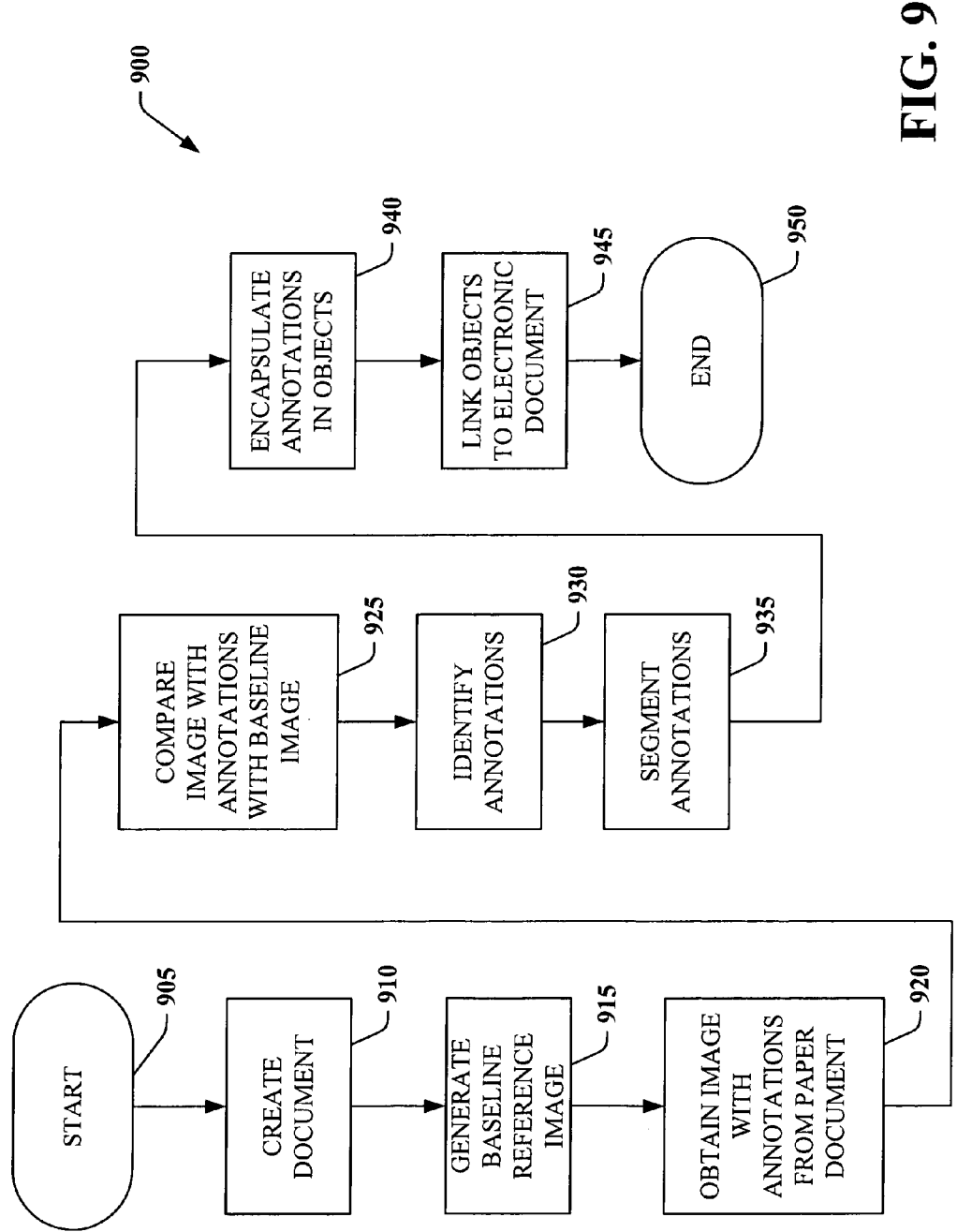
FIG. 9 is a flow diagram depicting a general processing flow.
Figure 10:
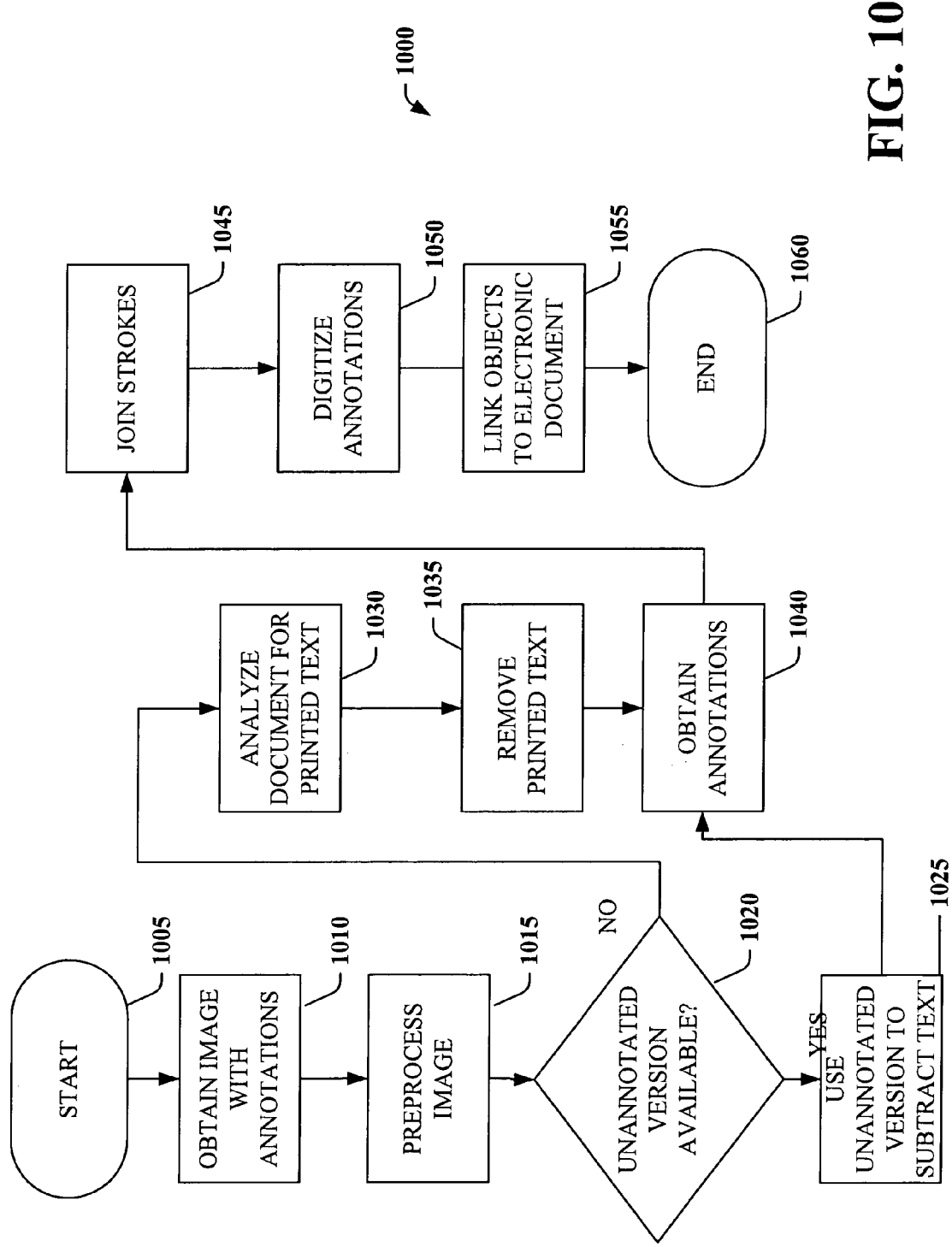
FIG. 10 is a flow diagram depicting a general processing flow.

With reference to FIGS. 8-10, flowcharts in accordance to various aspects of the invention are presented. While, for purposes of simplicity of explanation, the one or more methodologies shown herein, for example, in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

FIG. 8 is a flow diagram depicting a general processing flow 800 in accordance with yet another aspect of the invention. Processing begins at START block 805 and continues to process block 810. At process block 810 an electronic image of a document that includes annotations is obtained. Processing continues to process block 815 where preprocessing of the image occurs. At process block 820 the preprocessed image is sent to a search engine. At decision block 825 a determination is made whether an original unannotated version of the document can be located. If no, processing continues at process block 830 where the document is processed to remove printed text. If yes, processing continues at process block 835 where the located original is used to subtract printed text from the annotated image. Processing continues from either process block 830 or 835 at process block 840 where annotations are obtained. At process block 845 the annotations are digitized. Processing concludes at END block 850.

FIG. 9 is a flow diagram depicting a general processing flow 900 in accordance with yet another aspect of the invention. Processing begins at START block 905 and continues to process block 910. At process block 910 an electronic version of a document is created. Processing continues to process block 915 where a baseline image is generated. At process block 920 an image of a document that includes annotations is obtained. Processing continues to process block 925 where the baseline reference image is compared with the images of the document that includes annotations.

Annotations of the document are identified at process block 930. At process block 935, annotations are separated into individual annotation marks. Processing continues at process block 940 where the separated annotations are encapsulated in objects. At process block 945, the objects are linked to appropriate anchor locations within an electronic version of the document. Processing concludes at END block 950.

FIG. 10 is a flow diagram depicting a general processing flow 1000 in accordance with yet another aspect of the invention. Processing begins at START block 1005 and continues to process block 1010. At process block 1010 an electronic version image of a document that includes annotations is obtained. Processing continues to process block 1015 where preprocessing of the image occurs. At decision block 1020 a determination is made whether an unannotated version of the document exists. If no, processing continues at process block 1030 where the document is analyzed for printed text. At process block 930 the printed text is removed.

If the determination made at process block 1020 is yes, processing continues at process block 1025 where the unannotated image of the document is used to subtract text from the annotated image. Processing continues from either process block 1025 or process block 1035 at process block 1040 where annotations are obtained. At process block 1045 strokes of annotations are joined. Processing continues at process block 1050 where the annotations are digitized. The digitized annotations are linked to appropriate anchor locations within the electronic document at process block 1055. Processing concludes at END block 1060.

Figure 11:
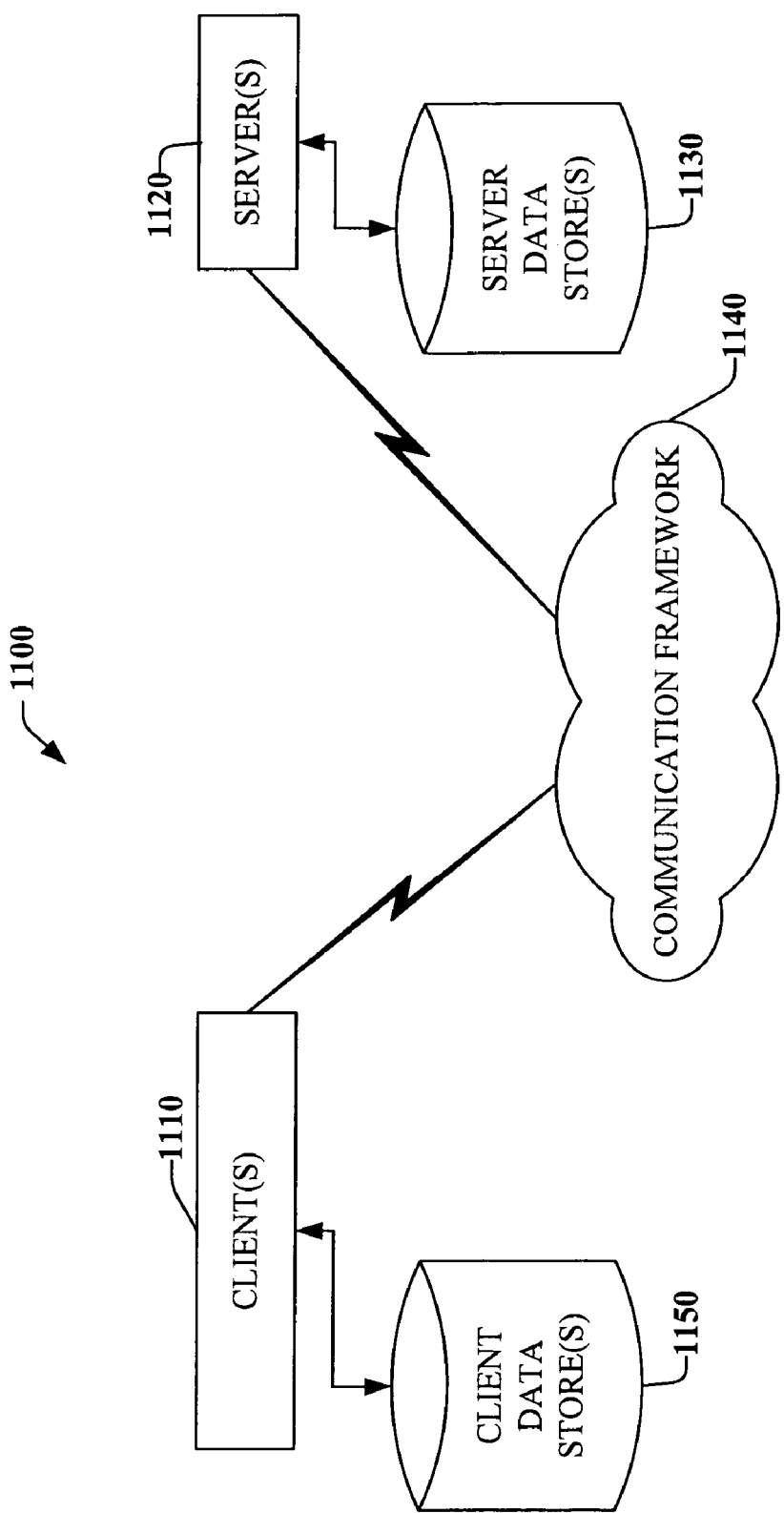
FIG. 11 is a schematic block diagram of a sample-computing environment.
Figure 12:
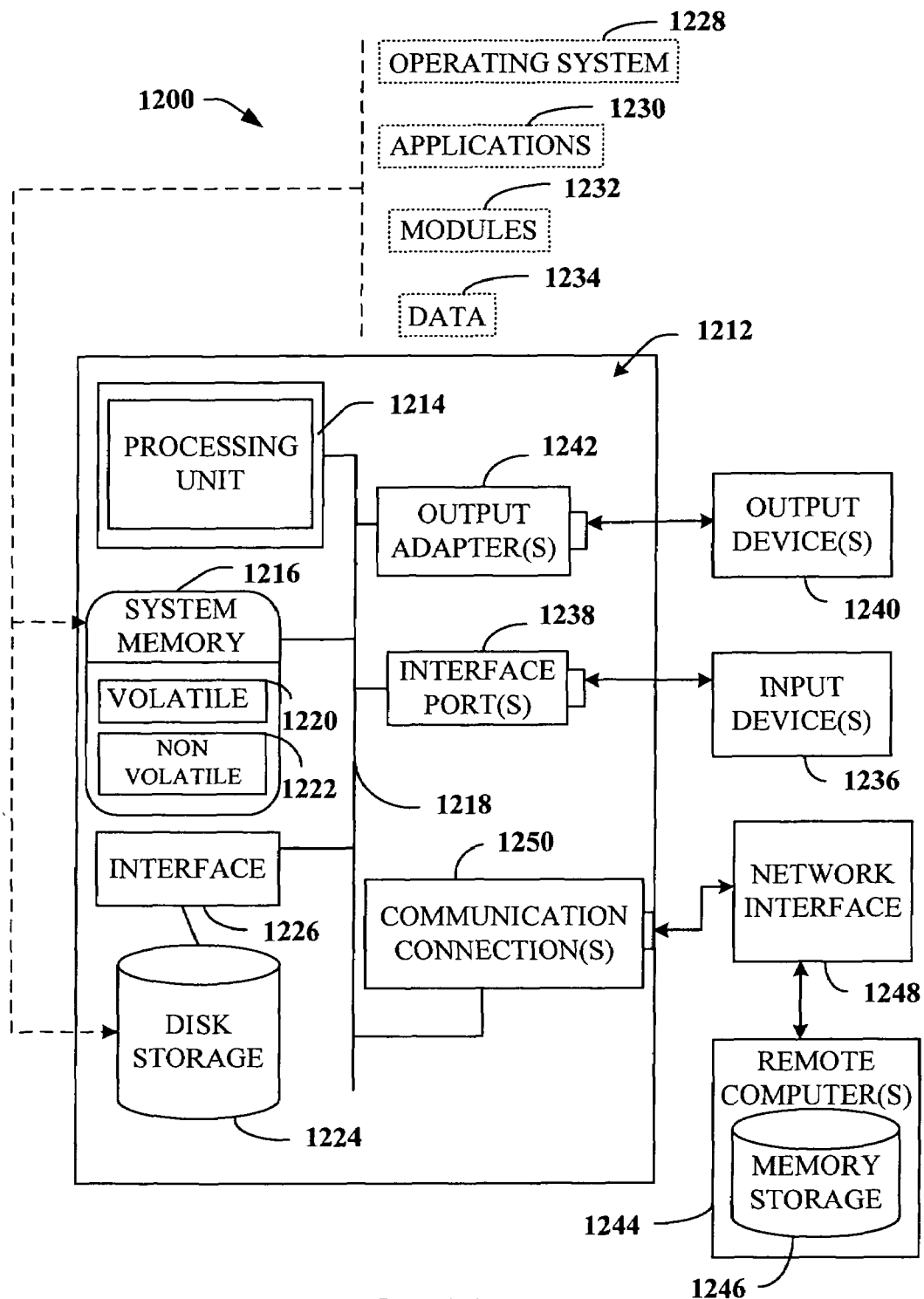
FIG. 12 is a schematic block diagram of an exemplary computing environment.

In order to provide additional context for implementing various aspects of the subject invention, FIGS. 11-12 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing system 1100. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads or processes to perform transformations by employing the subject invention, for example.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various disclosed and described components and methods includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system having a processor communicatively coupled to a memory for facilitating obtaining ink annotations from paper, comprising:
    a comparator that compares an initial electronic version of a document with an electronic image of an annotated version of the document to identify an ink annotation supplementing original text of the initial electronic version of the document, the ink annotation including at least one of emphasis highlighting, typewritten information, stamped information, or printed information placed over, near, or around original text;
    an annotation lifter that extracts the ink annotation from the electronic image and converts the ink annotation into an independent computer-usable object and assigns a document-altering command to the object based on an effect on the electronic image determined for the ink annotation;
    an image registration component that registers the electronic image of an annotated version of the document with the initial electronic version of the document; an image subtractor that subtracts an image of the initial electronic version of the document from the electronic image of an annotated version;
    a stroke joiner that joins a broken stroke of the ink annotation, the broken stroke being included in the ink annotation; and,
    an integrator that inserts the computer-usable object representing the ink annotation at an appropriate nonstatic anchor position within an editing version of the document.

2. The system of claim 1, further comprising a preprocessor that performs a preprocessing task on the image of the annotated version of the document, the preprocessing task including at least one of white balancing, Bayer's effect removal, and perspective correction.

3. The system of claim 2, further comprising a caching component that creates the initial electronic version.

4. The system of claim 3, further comprising a search component that locates the initial electronic version of the document for use by the comparator.

5. A computer-implemented method for lifting handwritten annotations from a document comprising:
using the computer to perform the actions of:
comparing an initial electronic version of a document with an electronic image of an annotated version of the document; identifying a handwritten annotation in the electronic image;
converting the handwritten annotation into an object form usable by a computer; and associating a document-altering command to the object form;
registering the electronic image of the annotated version of the document with the initial electronic version;
subtracting the image of the initial electronic version of the document from the electronic image of the annotated version;
joining a broken stroke of the ink annotation, the broken stroke being included in the ink annotation; and
inserting the converted handwritten annotation at a nonstatic position in an editing version of the document.

6. The method of claim 5, further comprising a preprocessor that performs a preprocessing task on the image of the annotated version of the document, the preprocessing task including at least one of white balancing, Bayer's effect removal, and perspective correction.

7. A computer-implemented system having a processor communicatively coupled to a memory for lifting handwritten annotations from a document, comprising:
means for comparing an initial electronic version of a document with an electronic image of an annotated version of the document;
means for identifying a handwritten annotation in the electronic image;
means for converting the handwritten annotation into an independent data representation and for assigning a document-altering command to the data representation;
means for registering the electronic image of the annotated version of the document with the initial electronic version;
means for subtracting the image of the initial electronic version of the document from the electronic image of the annotated version;
means for joining a broken stroke of the ink annotation, the broken stroke being included in the ink annotation; and
means for inserting the converted handwritten annotation into a nonstatic position in an editing version of the document.

8. The system of claim 7, further comprising a preprocessor that performs a preprocessing task on the image of the annotated version of the document, the preprocessing task including at least one of white balancing, Bayer's effect removal, and perspective correction.

* * * * *